United States Patent
Feliss et al.

(10) Patent No.: US 8,174,782 B2
(45) Date of Patent: May 8, 2012

(54) METHODS FOR DEPOSITING LUBRICANT ONTO DISKS AND SYSTEMS THEREOF

(75) Inventors: Norbert A. Feliss, Aptos, CA (US); Donald Ray Gillis, San Jose, CA (US); Bernhard E. Knigge, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 576 days.

(21) Appl. No.: 12/328,530

(22) Filed: Dec. 4, 2008

(65) Prior Publication Data

US 2010/0142072 A1 Jun. 10, 2010

(51) Int. Cl.
G11B 27/36 (2006.01)
G11B 5/02 (2006.01)
G11B 21/02 (2006.01)

(52) U.S. Cl. ............ 360/31; 360/55; 360/75; 118/708; G9B/27.052

(58) Field of Classification Search .................. None
See application file for complete search history.

(56) References Cited

U.S. PATENT DOCUMENTS

| | | | |
|---|---|---|---|
| 5,229,899 A | 7/1993 | Brown et al. | 360/97.02 |
| 5,331,487 A | 7/1994 | Gregory et al. | 360/97.02 |
| 5,543,983 A | 8/1996 | Gregory et al. | 360/97.02 |
| 6,914,739 B2 * | 7/2005 | Feliss et al. | 360/69 |
| 7,068,449 B2 * | 6/2006 | Riddering et al. | 360/25 |
| 7,342,736 B1 * | 3/2008 | Turner et al. | 360/75 |
| 7,457,072 B2 * | 11/2008 | Dieron et al. | 360/75 |
| 7,508,618 B1 * | 3/2009 | Herbst et al. | 360/75 |
| 2008/0024909 A1 | 1/2008 | Ang et al. | 360/98.01 |
| 2008/0050521 A1 | 2/2008 | Ma et al. | 427/248.1 |
| 2008/0056629 A1 * | 3/2008 | Nakano et al. | 384/100 |

* cited by examiner

Primary Examiner — Daniell L Negron
(74) Attorney, Agent, or Firm — Zilka-Kotab, PC (57) ABSTRACT

A system in one embodiment includes a disk; a reservoir having a selectively openable cover; a lubricant in the reservoir; and a sensor for detecting an event or condition that triggers opening of the cover. A method in another embodiment includes determining that a trigger event or a trigger condition is occurring or has occurred in a hard disk drive; opening a cover of a lubricant reservoir for allowing egress of lubricant therefrom upon determining that the trigger event or the trigger condition has occurred; and closing the cover of the lubricant reservoir after a period of time. Additional systems and methods are also presented.

25 Claims, 7 Drawing Sheets

METHODS FOR DEPOSITING LUBRICANT ONTO DISKS AND SYSTEMS THEREOF

FIELD OF THE INVENTION

The present invention relates to data storage systems, and more particularly, this invention relates to lubricating disks used in the storage of data.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, the boundary layer is swept along by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The depletion of lubricant on disks in a hard disk drive is always a concern when there is movement of the lubricant from a given track to another track or from a macro perspective from one region to another region on the disk. A macro perspective movement may be a movement from an inner radial track position to an outer radial track position. The lubricant may become depleted due to mobility of the lubricant or external influences such as high rotations per minute (RPM), high temperatures and/or head transport. The lubricant will typically be removed from one region of the disk and moved to another, i.e., from the inner track radial position to the outer track radial position, or vice versa.

In addition, there is an added problem of lubricant loss via evaporation due to sinking regions within the drive or leakage from the drive. If there are screw holes that are not appropriately sealed, the lubricant may migrate out of the drive to the outside environment due to a concentration effect, i.e., the lubricant may migrate from an area of higher concentration to an area of lower concentration.

Lubricant depletion can also be due to electrostatic voltage differences between slider and disk, i.e., the slider disk pair act similar to a capacitor. Lubricant is slightly electronegative (less than 0V) and comes off the disk easily if a positive voltage is applied to the slider body. Voltage differences occur in HDD's due to spindle motor charging up (tribo-charging) and due to contact potential differences between slider and disk. The contact potential (or surface potential) arrives from a work function difference between the two materials (slider and disk). Typically, the surface potentials in current disk drives is about 0.4V which drives lubricant depletion. Offsetting the surface potential may reduce lube pickup. However, lubricant passivates the slider and changes the surface potential, i.e., by measuring the surface potential over the entire disk one can map the regions of lube depletion. This could give an additional trigger event to open the lube reservoir. Regions of large lube depletion can be triggered by these 3 events: 1) surface potential change 2) clearance change 3) friction change. In regions of large lubricant depletion, a slider disk contact would also yield much higher wear rate. The disk can then be mapped out for (single or multi-track) disk contact potential to find regions of lube depletion. This would allow a trigger for opening the lubricant reservoir.

Therefore, it would be beneficial to have a system or method to replenish the lubricant at the depleted positions, i.e., any region where there is a high rate of lubricant depletion.

SUMMARY OF THE INVENTION

A system in one embodiment includes a disk; a reservoir having a selectively openable cover; a lubricant in the reservoir; and a sensor for detecting an event or condition that triggers opening of the cover.

A method in another embodiment includes determining that a trigger event or a trigger condition is occurring or has occurred in a hard disk drive; opening a cover of a lubricant reservoir for allowing egress of lubricant therefrom upon determining that the trigger event or the trigger condition has occurred; and closing the cover of the lubricant reservoir after a period of time.

A method in yet another embodiment includes determining that a trigger event or a trigger condition is occurring or has occurred in a hard disk drive; opening a cover of a reservoir for allowing egress of a corrosion inhibitor therefrom upon determining that the trigger event or the trigger condition has occurred; and closing the cover of the reservoir after a period of time.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a system comprises a disk, a reservoir having a selectively openable cover, a lubricant in the reservoir, and a sensor for detecting an event or condition that triggers opening of the cover.

In another general embodiment, a method comprises determining that a trigger event or a trigger condition is occurring or has occurred in a hard disk drive, opening a cover of a lubricant reservoir for allowing egress of lubricant therefrom upon determining that the trigger event or the trigger condition has occurred, and closing the cover of the lubricant reservoir after a period of time.

In yet another general embodiment, a method comprises determining that a trigger event or a trigger condition is occurring or has occurred in a hard disk drive, opening a cover of a reservoir for allowing egress of a corrosion inhibitor therefrom upon determining that the trigger event or the trigger condition has occurred, and closing the cover of the reservoir after a period of time.

Figure 1:
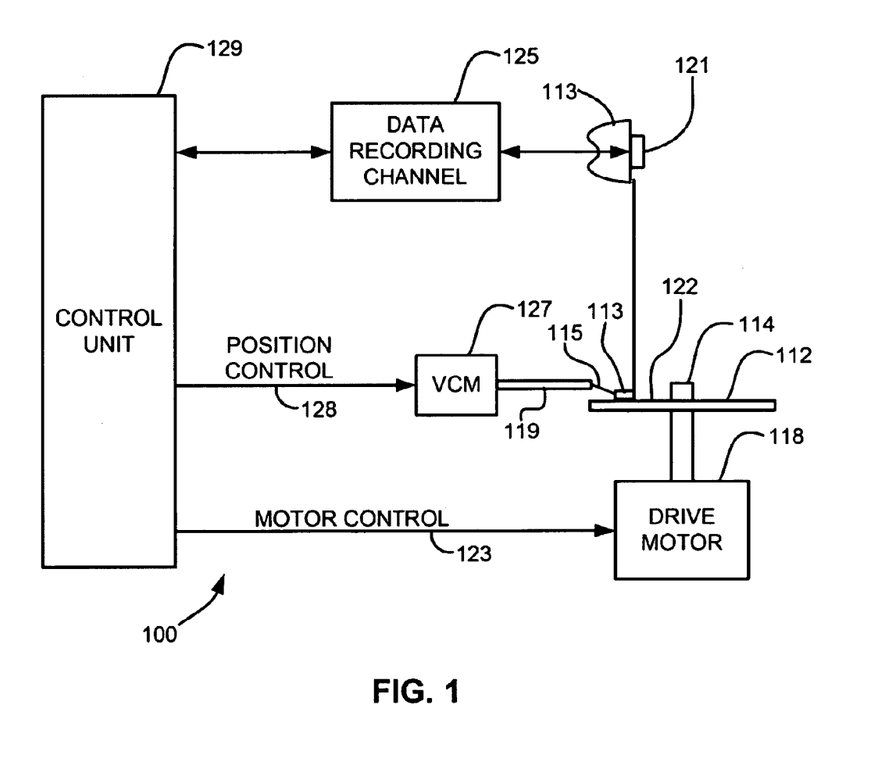
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
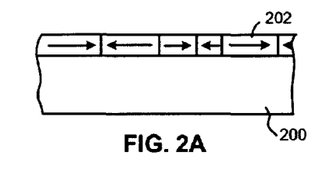
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
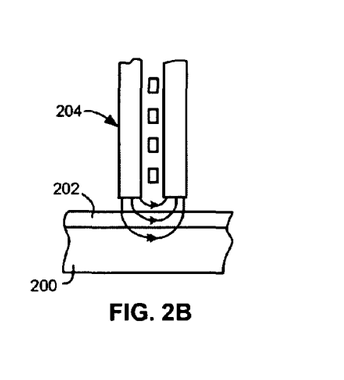
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
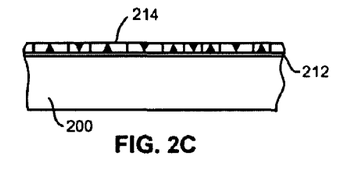
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
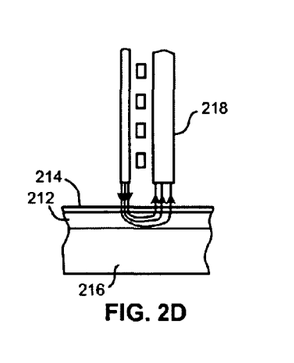
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
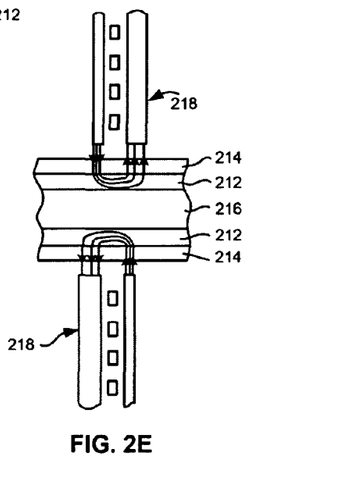
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
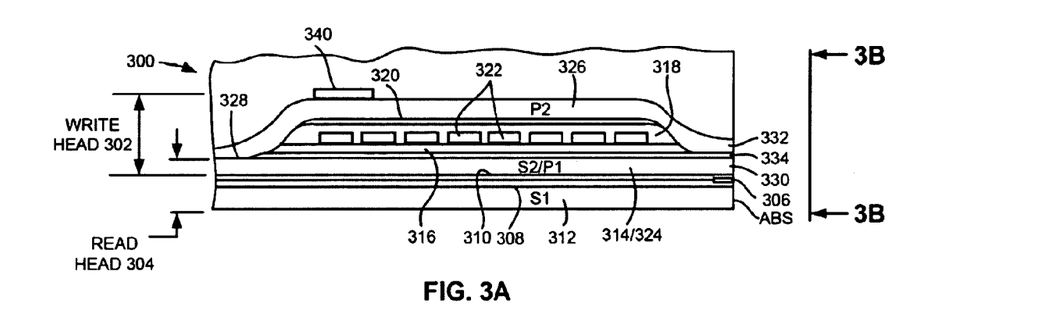
FIG. 3A is a partial view of a merged magnetic head.
Figure 3B:
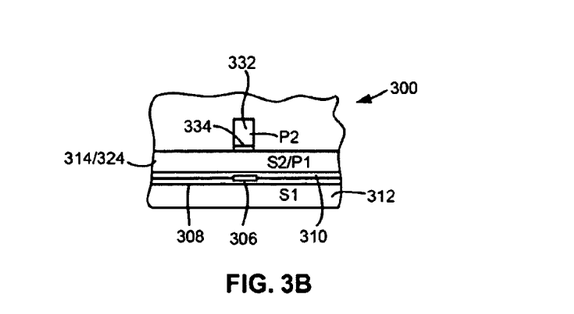
FIG. 3B is a partial ABS view, not to scale, of the slider taken along plane 3B-3B of FIG. 3A.

FIG. 3A is a side cross-sectional elevation view of an illustrative merged magnetic head 300, which includes a write head portion 302 and a read head portion 304, the read head portion 304 employing a spin valve sensor 306. FIG. 3B is an ABS view of FIG. 3A. The spin valve sensor 306 is sandwiched between nonmagnetic electrically insulative first and second read gap layers 308 and 310, and the read gap layers are sandwiched between ferromagnetic first and second shield layers 312 and 314. In response to external magnetic fields, the resistance of the spin valve sensor 306 changes. A sense current ($I_s$) conducted through the sensor causes these resistance changes to be manifested as potential changes. These potential changes may then be processed as readback signals by processing circuitry, e.g., processing circuitry of the control unit (129, FIG. 1).

The write head portion 302 of the magnetic head 300 includes a coil layer 322 sandwiched between first and second insulation layers 316 and 318. A third insulation layer 320 may be employed for planarizing the head to eliminate ripples in the second insulation layer caused by the coil layer 322. The first, second and third insulation layers are referred to in the art as an "insulation stack".

The coil layer 322 and the first, second and third insulation layers 316, 318 and 320 are sandwiched between first and second pole piece layers 324 and 326. The first and second pole piece layers 324 and 326 are magnetically coupled at a back gap 328 and have first and second pole tips 330 and 332 which are separated by a write gap layer 334 at the ABS. Since the second shield layer 314 and the first pole piece layer 324 are a common layer this head is known as a merged head. In a piggyback head, an insulation layer is located between a second shield layer and a first pole piece layer. First and second solder connections (not shown) connect leads (not shown) from the spin valve sensor 306 to leads (not shown) on the slider (113, FIG. 1), and third and fourth solder connections (not shown) connect leads (not shown) from the coil 322 to leads (not shown) on the suspension. A heater 340 may be present to induce protrusion, as discussed immediately below. The position of the heater 340 may vary based on design parameters such as where the protrusion is desired, coefficients of thermal expansion of the surrounding layers, etc.

As mentioned above, slider head designs may have a small heater 340 next to the read/write elements. If an electric current is applied to this heater 340, the region around the heater 340 may thermally expand leading to reduced head-disk spacing. This is often referred to as Thermal Fly-height Control (TFC).

Figure 4A:
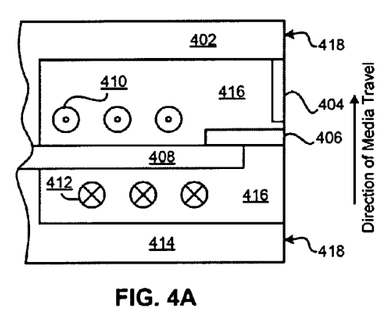
FIG. 4A is a cross-sectional view of one particular embodiment of a perpendicular magnetic head with helical coils.

FIG. 4A is a cross-sectional view of a perpendicular magnetic head. In FIG. 4A, helical coils 410 and 412 are used to create magnetic flux in the stitch pole 408, which then delivers that flux to the main pole 406. Coils 410 indicate coils extending out from the page, while coils 412 indicate coils extending into the page. Stitch pole 408 may be recessed from the ABS 418. Insulation 416 surrounds the coils and may provide support for some of the elements. The direction of the media travel, as indicated by the arrow to the right of the structure, moves the media past the lower return pole 414 first, then past the stitch pole 408, main pole 406, trailing shield 404 which may be connected to the wrap around shield (not shown), and finally past the upper return pole 402. Each of these components may have a portion in contact with the ABS 418. The ABS 418 is indicated across the right side of the structure.

Perpendicular writing is achieved by forcing flux through the stitch pole 408 into the main pole 406 and then to the surface of the disk positioned towards the ABS 418.

Figure 4B:
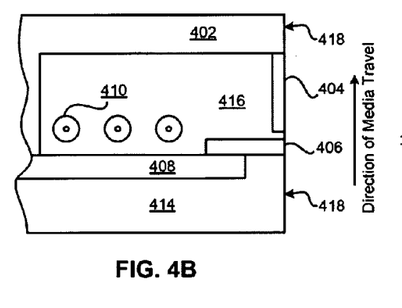
FIG. 4B is a cross-sectional view of one particular embodiment of a perpendicular magnetic head with looped coils.

FIG. 4B is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4C:
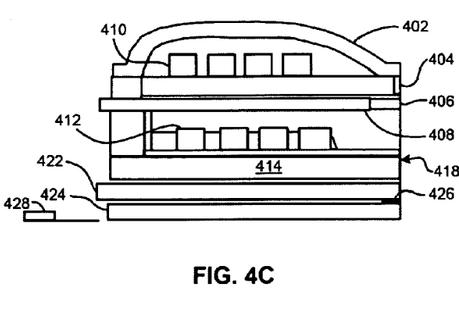
FIG. 4C is a cross-sectional view of one particular embodiment of a piggyback magnetic head with helical coils.

FIG. 4C illustrates a piggyback magnetic head having similar features to the head of FIG. 4A. Two shields 404, 414 flank the stitch pole 408 and main pole 406. Also sensor shields 422, 424 are shown. The sensor 426 is typically positioned between the sensor shields 422, 424.

Figure 4D:
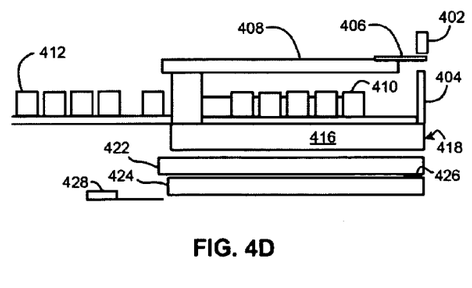
FIG. 4D is a cross-sectional view of one particular embodiment of a piggyback magnetic head with looped coils.

FIG. 4D illustrates another type of piggyback magnetic head having similar features to the head of FIG. 4B including a helical coil 410. Also, sensor shields 422, 424 are shown. The sensor 426 is typically positioned between the sensor shields 422, 424.

In FIGS. 4C and 4D, an optional heater 428 is shown near the non-ABS side of the magnetic head. A heater 428 may also be included in the magnetic heads shown in FIGS. 4A and 4B. The position of this heater 428 may vary based on design parameters such as where the protrusion is desired, coefficients of thermal expansion of the surrounding layers, etc.

In some embodiments, a lubricant may be contained inside a suitable container or reservoir with a small orifice or hole, preferably at or near its center. In addition, one or more comparable orifice(s), possibly with about the same diameter, may be manufactured in the side of the enclosure, such as a hard disk drive casing. The container may be positioned relatively close to the wall of the enclosure where leakage typically occurs. This placement may allow the temperature of the container to be similar to the temperature of the wall of the enclosure. Thus the relationship between the container and the enclosure may be expressed as shown in Equation 1.

$$\frac{d(\text{container})}{dt} = k\frac{d(\text{enclosure})}{dt} \qquad \text{Equation 1}$$

Where k is the diffusion constant of lubricant out of the enclosure via holes, cracks, splits, etc. The rate of escape of lubricant from the container is equal to the rate of escape of lubricant from the enclosure through sinks within the enclosure or the enclosure wall surface area (holes, cracks, splits, etc.).

In some embodiments, the enclosure may be a hard disk drive (HDD) enclosure. For the sake of simplicity in using examples to more fully explain the inventive concepts herein, the enclosure will be referred to as a HDD enclosure for the balance of this description. This, of course, in no way limits the scope of the invention, as any type of enclosure which may take advantage of a lubricant system and methods of supplying lubricant may be used in the place of the HDD enclosure.

Figure 5A:
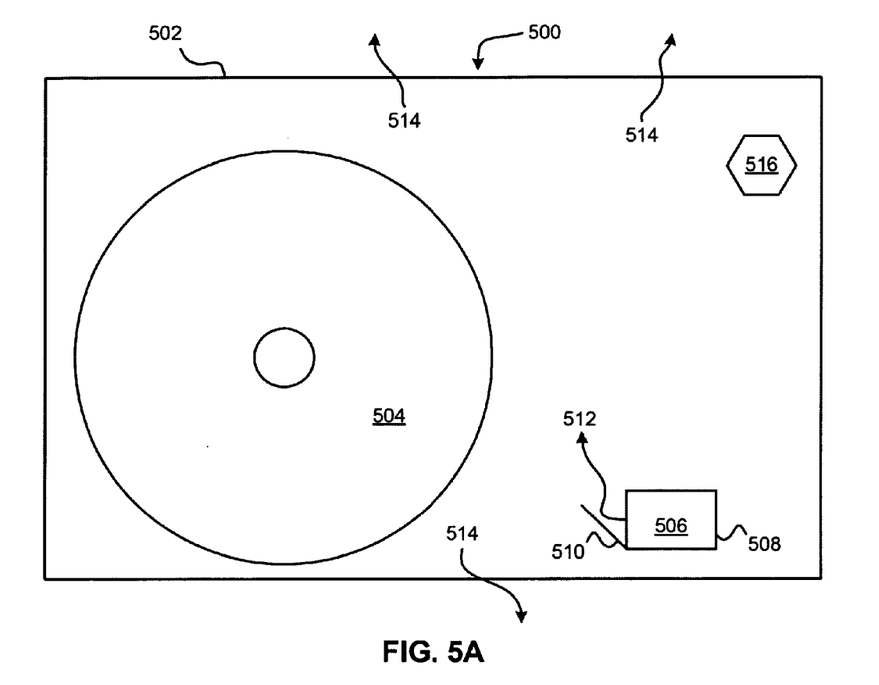
FIG. 5A shows a simplified schematic diagram of a system according to one embodiment.

Now referring to FIG. 5A, a system 500 is shown according to one embodiment. The system 500 may include a disk 504, a reservoir 508 having a selectively openable cover 510, a lubricant 506 in the reservoir 508, and a sensor 516 for detecting an event or condition that may trigger opening of the cover 510. In some embodiments, to cope with lubricant 506 losses throughout the life of a HDD, a lubricant reservoir 508 may have an orifice with an automatic cover 510 that will either be closed (preventing lubricant 506 from escaping 512) or be opened (allowing lubricant 506 to escape 512 from the reservoir 508) and the rate of departure of lubricant 506 from the reservoir 508 may be controlled depending on sensor 516 readings.

The reservoir 508 may be placed in the enclosure 502 such that lubricant may be pumped across a low pressure zone. This may allow for small diffusion treatment of lubricant depleted parts. In another embodiment, the reservoir 508 may be placed in the enclosure 502 such that lubricant may be pumped across a high pressure zone. This may allow for heavy treatment, when there is substantial lubricant depletion. Thus, force pumping may be allowed across a pressure gradient.

Note that the sensor 516 can refer to the MR sensor used to read data from the disk 504, or any other type of sensor including those that measure one or more ambient conditions such as temperature, pressure, humidity, etc., an acceleration sensor for detecting shocks and/or drops, an optical sensor, etc. Moreover, the sensor 516 may be part of a sensor system that determines whether the trigger event or trigger condition has occurred or is occurring. Further, the sensor system may be an open loop system or a closed loop system. In the latter case, the closed loop system may determine when to close the cover 510 of the reservoir 508.

When the lubricant reservoir cover 510 is opened, it allows lubricant 506 to escape into the inside atmosphere of the enclosure 502, such as a HDD enclosure. Due to its vapor pressure the evaporating lubricant 506 escaping 512 from the reservoir 508 may deposit onto the lubricant depleted surfaces of the disk(s) 504 and may preferentially fill in the areas of lubricant depletion. One or more similar reservoirs with openings may be situated on the wall of the enclosure 502, or anywhere else so that they may provide lubricant 506 to the system 500 that can be aided by the beneficial air flow of the hard disk drive. In addition, the additional reservoirs may be near to the original lubricant reservoir 506 or in other places in the HDD, enclosure 502.

Many potential leakage sites 514 may exist in a standard HDD enclosure, including holes in the cover seal, holes in the screw attachments, micro-features and fissures in the general HDD structure, etc. At any given time, the lubricant vapor that may escape through the various leakage points 514 in the HDD enclosure 502 may be replaced on depleted areas of the disk surfaces from the lubricant 506 in an opened reservoir 508. Through this method, lubricant 506 will be drawn out of the lubricant reservoir 508 (via its vapor pressure) as is needed to replace lubricant lost due to leakage points 514.

In some embodiments, the reservoir 508 may include other chemicals in addition to a lubricant 506, such as other compatible lubricants (lubricants that are compatible with a disk lubricant 506 already included in the reservoir 508). For example, if the lubricant 506 included in the reservoir 508 is Z-Tetraol, the additional lubricant may be ZDOL2000, ZDOL4000, AM4000, etc. Each of these lubricants has been used in conjunction with Z-Tetraol, and has worked sufficiently together. Also, in some embodiments, more than one compatible lubricant may be included with the lubricant 506 in the reservoir 508. Furthermore, the lubricant 506 in the reservoir 508 may be different than a lubricant that was initially on the disk 504.

In other embodiments, one or more chemicals may be added to one or more lubricants in the reservoir 508 to add other enhancing properties, such as corrosion resistance, wear resistance, friction reducer, etc. For example, if the magnetic head used includes carbon which has degraded over time due to contact and burnishing is evident, corrosion inhibitor chemicals may be added to the lubricant 506 in the reservoir 508 to protect the read/write elements and head components from further corrosion.

In some embodiments, vapor corrosion inhibitors (VCI) may be used. These are compounds which may be transported in a closed environment to the site of corrosion by volatilization from a source. For example, volatile solids such as salts of dicyclohexylamine, cyclohexylamine, hexamethyleneamine, etc., morpholine, hydrazine, etc., may be used. The vapor of the volatile solid salts may condense and may be hydrolyzed by moisture to liberate the protective ions. The VCI may be in the same reservoir as the lubricant, or may be in a separate and independent reservoir.

One such VCI developed for steel in bis-piperidiniummethyl-urea (BPMU). Its vapor corrosion inhibition property was evaluated by volatile inhibiting sieve testing (VIS). Electrochemical impedance spectroscopy of a volatile corrosion inhibitor monitor cell (VCIM) was applied to study the effect of BPMU on the corrosion inhibition of mild steel under a thin electrolyte layer. The results show that BPMU has a good protection effect for steel.

In another example, copper is a more noble metal than cobalt, but has an oxide that is an equally marginal surface passivator. Copper is a viable engineering material in head design, largely as a result of the very effective corrosion inhibiting effect provided by benzotriazole (1 H-BTA) and its derivatives (1,2,3-benzotriazole (BTA)). The 1 H-BTA compound reacts with a metallic copper surface to form a Cu-BTA film. Depending upon the details of the preparation, the film may be as thin as about 2 Angstroms thick. Even such a thin film may provide effective corrosion inhibiting effect Once formed, the thin film may reduce the corrosion rate of copper in water (with or without the addition of a corrosion inhibitor) by more than two orders of magnitude.

In one embodiment, a second reservoir may be included in the system 500 in addition to the first reservoir 508, wherein the second reservoir may include a selectively openable cover and a corrosion inhibitor chemical in the second reservoir.

Figure 5B:
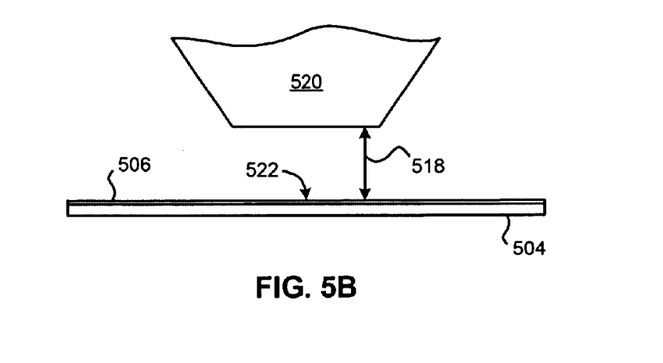
FIG. 5B shows a detailed view of an interaction between a head and a disk surface according to one embodiment.

Now referring to FIG. 5B, lubricant depletion in a HDD, if left without adequate replenishment, can eventually prove to be catastrophic and cause a head crash among other problems. Lubricant depletion can be caused by lubricant migration from the various areas of the disk 504 to the other areas within the HDD enclosure over a period of time. Lubricant depletion can also be caused by flying a head 520 with a TFC (thermal flying height) bulge that interferes with the lubricant at low flying heights 518. When the TFC heater is turned on, a bulge may appear that comes close to the surface of the disk 522. If some heads in the drive have initially low flying heights 518 (about 3 sigma) the TFC bulge may come close enough to the disk surface 522 to cause a track to lose its lubricant 506. The head can pick up the lubricant from the track and deposit it elsewhere on adjacent tracks. This makes the one track depleted of lubricant and other tracks in excess of lubricant.

In both of these cases, the lubricant depletion can be counteracted by monitoring the flying height of the head by different SVGA and SVGA-Hybrid type algorithms that detect friction-based changes of the head based on HDD timing with average and sigma, as would be known to one of reasonable skill in the relevant art. In addition, the electrical channel function of the drive provides flying height measurement capabilities either directly or indirectly by evaluating the Wallace Spacing Loss on the readback signal. According to some embodiments, if the flying height is non-steady and subject to large delta flying height fluctuations, this information can be transferred to the lubricant control system which may initiate a "cover opening" sequence, as shown in FIG. 6 below.

In some embodiments, when the lubricant reservoir cover is opened, the lubricant may be allowed to evaporate from the reservoir and condense out on the disk over a specific period of time. This lubricant condensing behavior may then "heal" the areas of excessive lubricant depletion by replenishing the lubricant in those areas. The head flying height may be monitored so that when the head flying height is steady over a track which had previously been depleted of lubricant, the lubricant reservoir cover can be closed and the evaporation of the lubricant may then be ceased.

In this embodiment, a "closed feedback" detection system for lubricant healing may be used. The Servo burst variable gain amplitude is defined as the SVGA measurement and the Hybrid technique is defined as the combination of the SVGA measurement combined with HDD system timing measurements. The TFC bulge flying height interactions and subsequent large delta flying height readings from the SVGA and SFGA-Hybrid type algorithms may act as a sensor to either open or close the lubricant reservoir. If no large delta flying height readings or unsteady SVGA and timing readings are observed, the lubricant well can be closed for longer periods of time. However, due to lubricant depletion (from the head) and evaporation of lubricant through HDD leakage points, the lubricant well may be opened for sustaining a constant thickness of the lubricant on the surface of the disks.

Figure 6:
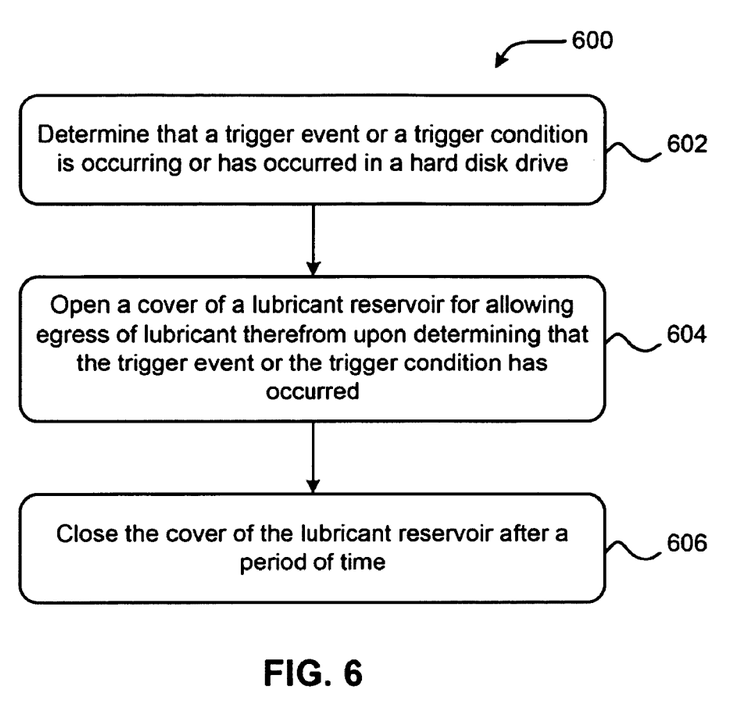
FIG. 6 shows a method according to one embodiment.

Now referring to FIG. 6, a method 600 is shown according to one embodiment. The method 600 may be used in the context of functionality of FIGS. 1-5B. Of course, the method 600 may be used in any desired environment, and is not limited in any way by FIGS. 1-5B.

With continued reference to FIG. 6, in operation 602, it is determined if a trigger event or a trigger condition is occurring or has occurred in a hard disk drive, the trigger event or trigger condition indicating that a lubricant deficiency is likely present on a disk. This may include detecting an actual lubricant deficiency on one or more tracks or areas of a disk, determining that there is a high probability of a deficiency, determining that an event has occurred that creates a high likelihood of local or global lubricant depletion, etc. The clearance is defined as the measurement of the head/disk separation at the trailing edge of the head, typically at the location of the read/write sensor elements. Several illustrative but non-exhaustive examples or potential trigger events or trigger conditions include delta fly height calculation, increase in soft or hard error rate in a readback channel, timing detection, unsteady SVGA output (including SVGA and SVGA-Hybrid type friction based algorithms and high fluctuation of the standard deviation of the SVGA and timing), system detects or induces touchdown (contact between head and disk, e.g., by determining that a TA (thermal asperity) is above a predetermined threshold value), system (HDD) shock is detected, leaks are detected possibly through detection of overall fly height increase which points to less lubricant thickness on disk surface, calculating a clearance of a sensor from a lubricant on a disk of the hard disk drive, calculating the amount of time in which a magnetic head of the hard disk drive is operating on a track on a disk of the hard disk drive, and determining when a predetermined amount of time has been reached, etc. In further approaches, the trigger event or the trigger condition may be based on a disk contact potential mapping.

In some embodiments, one or more of the above trigger events or conditions may be used in conjunction to determine if a trigger event or condition is occurring or has occurred.

In some embodiments, in which a trigger event is based on calculating a clearance of magnetic read/write sensor elements from a lubricant on a disk of the hard disk drive, the clearance of the sensor above the lubricant on the disk may be calculated for a particular data track on the disk.

In some embodiments, a trigger event may be a determination that a lubricant on a disk of the hard disk drive has been depleted above at least a portion of at least one data track.

The following patents are hereby incorporated by reference: U.S. Pat. No. 7,286,314, which describes a disk drive with localized clearance and content potential measurement capability; U.S. Pat. No. 7,016,139 which describes a magnetic recording disk drive with actively controlled electric potential at the head/disk interface for wear and durability control; U.S. Pat. No. 7,450,333 which describes electrostatic fly-height control; and U.S. Pat. No. 7,321,476 which describes a method and system for determining contact potential in a hard disk drive. Various procedures set forth therein may be used to determine whether a trigger event or condition has occurred or is occurring.

In operation 604, a cover of a lubricant reservoir may be opened for allowing egress of lubricant therefrom upon determining that the trigger event or trigger condition has occurred. In some embodiments, the cover may be automatically opened, and may be a lid, door, sliding panel, expandable orifice, etc.

In operation 606, the cover of the reservoir may be closed after a period of time. The period of time may be determined based on new measurements from a sensor which is detecting trigger events or trigger conditions, may be a preset time, where subsequent measurements may be taken after the system has had time to incorporate the newly added lubricant, may be opened and closed periodically over a period of time, etc.

In some embodiments, the cover of the reservoir may be closed after it is determined that the triggering event or condition is no longer occurring.

Figure 7:
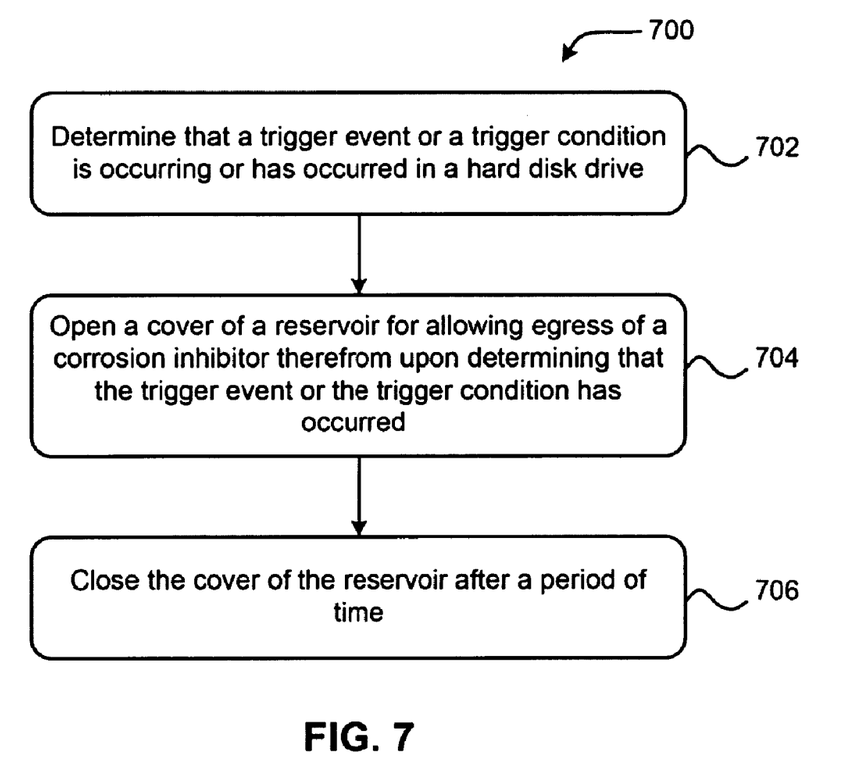
FIG. 7 shows a method according to one embodiment.

Now referring to FIG. 7, a method 700 is shown according to one embodiment. The method 700 may be used in the context of functionality of FIGS. 1-5B. Of course, the method 700 may be used in any desired environment, and is not limited in any way by FIGS. 1-5B.

With continued reference to FIG. 7, in operation 702, it is determined if a trigger event or a trigger condition is occurring or has occurred in a hard disk drive, the trigger event or trigger condition indicating that a lubricant deficiency is likely present on a disk. This may include detecting an actual lubricant deficiency on one or more tracks or areas of a disk, determining that there is a high probability of corrosion (by means of activation of a corrosion sensor) on the HDD or other surfaces, determining that any of the before mentioned triggering events or conditions has occurred, etc. an event has occurred that creates a high likelihood of local or global lubricant depletion, etc.

In some embodiments, determining that a trigger event or a trigger condition is occurring or has occurred includes determining that a lubricant on a disk of the hard disk drive has been depleted above at least a portion of at least one track. At such sites, the magnetic layer of the disk might be susceptible to corrosion, and so the corrosion inhibitor may be applied to minimize corrosion, with or without concurrent or subsequent addition of lubricant.

In operation 704, a cover of a reservoir may be opened for allowing egress of a corrosion inhibitor therefrom upon determining that the trigger event or trigger condition has occurred. In some embodiments, the cover may be automatically opened, and may be a lid, door, sliding panel, expandable orifice, etc.

In operation 706, the cover of the reservoir may be closed after a period of time. The period of time may be determined based on new measurements from a sensor which is detecting trigger events or trigger conditions, may be a preset time, where subsequent measurements may be taken after the system has had time to incorporate the newly added corrosion inhibitor, may be opened and closed periodically over a period of time, etc.

In some embodiments, the cover of the reservoir may be closed after it is determined that the triggering event or condition is no longer occurring.

In some embodiments, the method 700 may further comprise determining that a second trigger event or a second trigger condition is occurring or has occurred in the HDD In addition, the method 700 may include opening a cover of a lubricant reservoir for allowing egress of lubricant therefrom upon determining that the second trigger event or second trigger condition has occurred. Further, the method 700 may include closing the cover of the lubricant reservoir after a period of time. For this embodiment example, the combination of the two trigger events is the primary event for corrosion detection and secondary event is for lubricant depletion detection.

In some embodiments, the lubricant in the lubricant reservoir may be of a different type than a lubricant that is initially on a disk of the HDD.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a disk;
a reservoir having a selectively openable cover;
a lubricant in the reservoir;
a second reservoir having a selectively openable cover;
a corrosion inhibitor in the second reservoir; and
a sensor for detecting occurrence of a first event or a first condition that triggers opening of the cover on the reservoir and for detecting occurrence of a second event or a second condition that triggers opening of the cover on the second reservoir.

2. A system as recited in claim 1, further comprising a corrosion inhibitor in the reservoir.

3. A system as recited in claim 1, further comprising a lubricant in the second reservoir.

4. A system as recited in claim 1, wherein the lubricant in the reservoir is different than a lubricant initially on the disk.

5. A system as recited in claim 1, wherein the reservoir is located in an enclosure surrounding the disk to allow force pumping across a pressure gradient.

6. A method, comprising:
determining that a trigger event or a trigger condition is occurring or has occurred in a hard disk drive;
opening a cover of a lubricant reservoir for allowing egress of lubricant therefrom upon determining that the trigger event or the trigger condition has occurred;
closing the cover of the lubricant reservoir after a period of time;
determining that a second trigger event or a second trigger condition is occurring or has occurred in the hard disk drive;
opening a cover of a corrosion inhibitor reservoir for allowing egress of corrosion inhibitor therefrom upon determining that the second trigger event or the second trigger condition has occurred; and
closing the cover of the corrosion inhibitor reservoir after a period of time.

7. A method as recited in claim 6, wherein determining that a trigger event or a trigger condition is occurring or has occurred includes calculating a flying height of a sensor above a disk of the hard disk drive.

8. A method as recited in claim 6, wherein determining that a trigger event or a trigger condition is occurring or has occurred includes calculating a clearance of a sensor above a lubricant on a disk of the hard disk drive.

9. A method as recited in claim 8, wherein the clearance of the sensor above the lubricant on the disk is calculated for a particular data track on the disk.

10. A method as recited in claim 6, wherein determining that a trigger event or a trigger condition is occurring or has occurred includes determining that a lubricant on a disk of the hard disk drive has been depleted above at least a portion of at least one track.

11. A method as recited in claim 6, wherein determining that a trigger event or a trigger condition is occurring or has occurred includes monitoring a soft error rate in a readback channel.

12. A method as recited in claim 6, wherein determining that a trigger event or a trigger condition is occurring or has occurred includes detecting an unsteady SVGA output.

13. A method as recited in claim 6, wherein determining that a trigger event or a trigger condition is occurring or has occurred includes determining that the hard disk drive has experienced a shock.

14. A method as recited in claim 6, wherein determining that a trigger event or a trigger condition is occurring or has occurred includes determining that a magnetic head of the hard disk drive has contacted a disk of the hard disk drive.

15. A method as recited in claim 6, wherein the cover of the lubricant reservoir is closed after a predetermined amount of time has elapsed from the opening thereof.

16. A method as recited in claim 6, wherein determining that a trigger event or a trigger condition is occurring or has occurred includes detecting a head-disk contact via determining that TA (thermal asperity) is above a predetermined threshold value.

17. A method is recited as in claim 6, wherein determining that a trigger event or a trigger condition is occurring or has occurred includes calculating the amount of time in which a magnetic head of the hard disk drive is operating on a track on a disk of the hard disk drive, and determining when a predetermined amount of time has been reached.

18. A method is recited as in claim 6, wherein the trigger event or the trigger condition is based on a disk contact potential mapping.

19. A method as recited in claim 6, wherein the cover of the lubricant reservoir is closed after determining that the trigger event or the trigger condition is no longer present.

20. A method as recited in claim 6, wherein a corrosion inhibitor is also in the lubricant reservoir.

21. A method as recited in claim 6, wherein the lubricant in the lubricant reservoir is different than a lubricant initially on a disk of the hard disk drive.

22. A method, comprising:
determining that a trigger event or a trigger condition is occurring or has occurred in a hard disk drive;
opening a cover of a reservoir for allowing egress of a corrosion inhibitor therefrom upon determining that the trigger event or the trigger condition has occurred;
closing the cover of the reservoir after a period of time;
determining that a second trigger event or a second trigger condition is occurring or has occurred in the hard disk drive;
opening a cover of a lubricant reservoir for allowing egress of lubricant therefrom upon determining that the second trigger event or the second trigger condition has occurred; and
closing the cover of the lubricant reservoir after a period of time.

23. A method as recited in claim 22, wherein determining that a second trigger event or a second trigger condition is occurring or has occurred includes at least one of the following:
calculating a flying height of a sensor above a disk of the hard disk drive;
calculating a clearance of a sensor above a lubricant on a disk of the hard disk drive;
determining that a magnetic head of the hard disk drive has contacted a disk of the hard disk drive; and
monitoring a soft error rate in a readback channel.

24. A method as recited in claim 22, wherein the lubricant in the reservoir is different than a lubricant initially on a disk of the hard disk drive.

25. A method as recited in claim 22, wherein determining that a trigger event or a trigger condition is occurring or has occurred includes at least one of the following:
determining that a corrosion sensor has been activated;
determining that a magnetic head of the hard disk drive has contacted a disk of the hard disk drive; and
determining that a lubricant on a disk of the hard disk drive has been depleted above at least a portion of at least one track.

* * * * *